May 26, 1925.
J. PETERSON
Re. 16,084
TOBACCO PACKAGE OR CONTAINER
Original Filed July 17, 1923
2 Sheets-Sheet 1
Fig. 1,
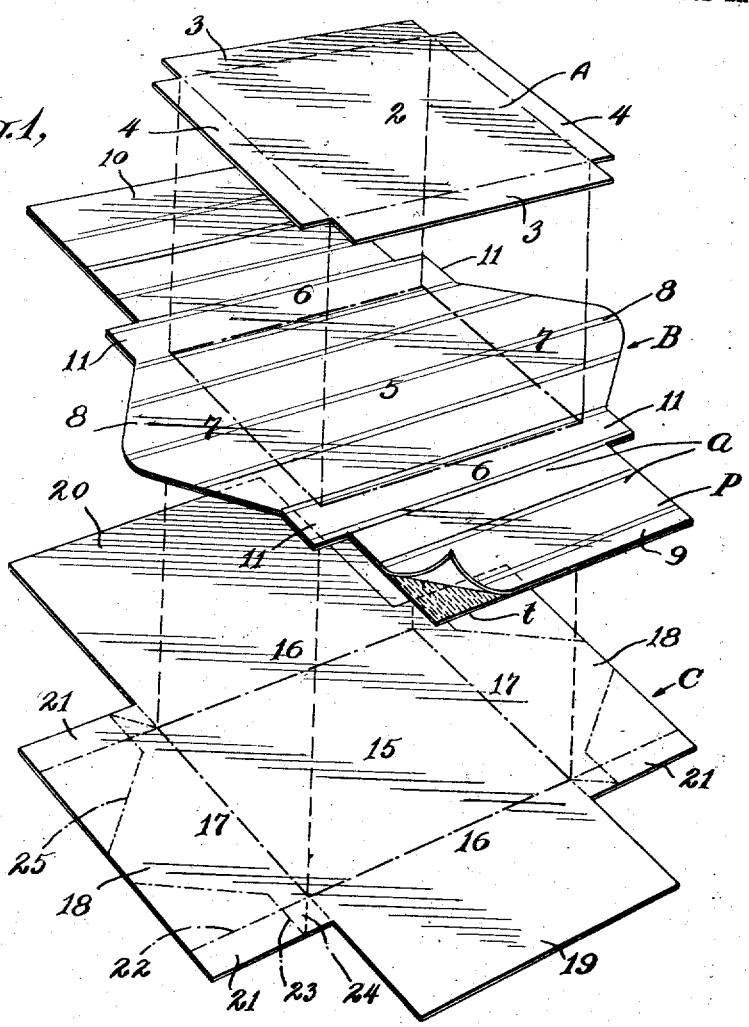
Fig. 2,
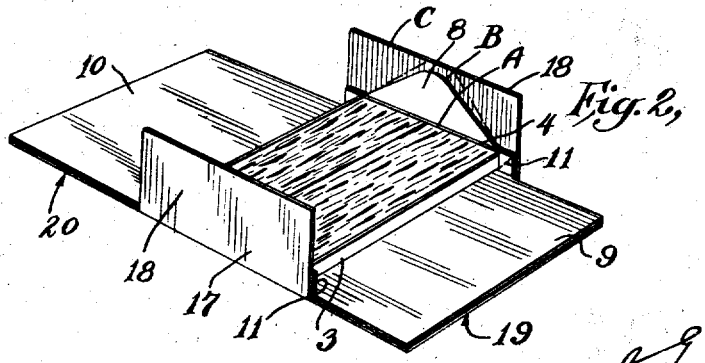
INVENTOR
JONATHAN PETERSON
BY
J. Granville Meyers
ATTORNEY May 26, 1925.
J. PETERSON
Re. 16,084
TOBACCO PACKAGE OR CONTAINER
Original Filed July 17, 1923
2 Sheets-Sheet 2
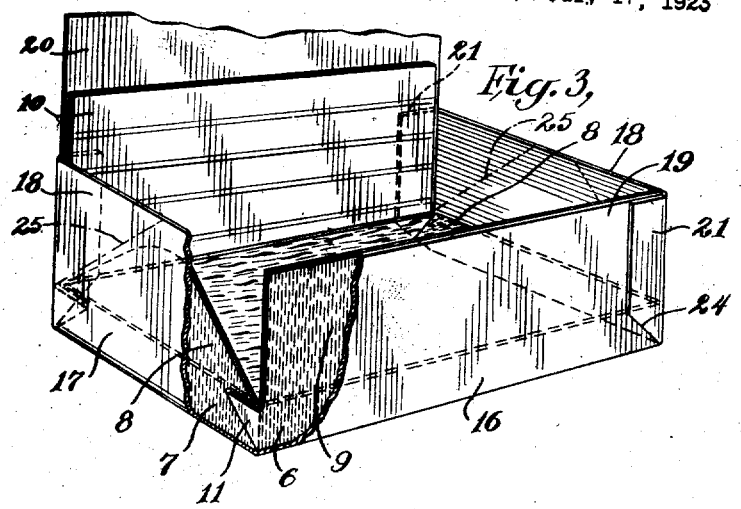
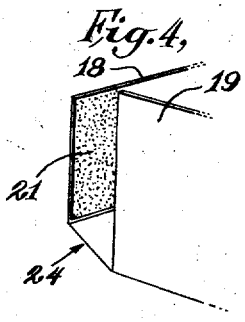
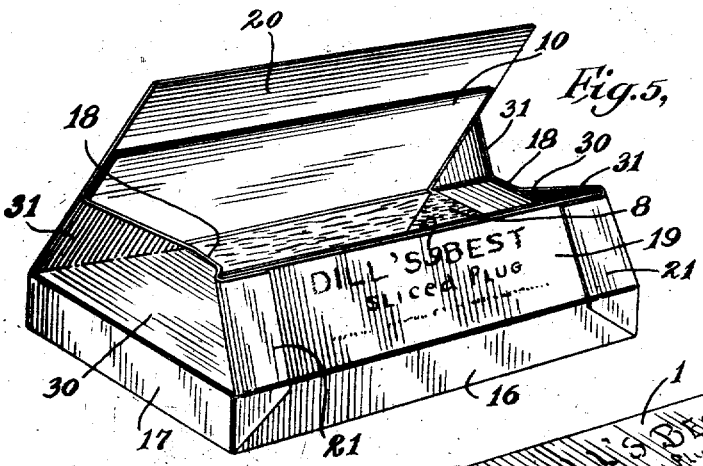
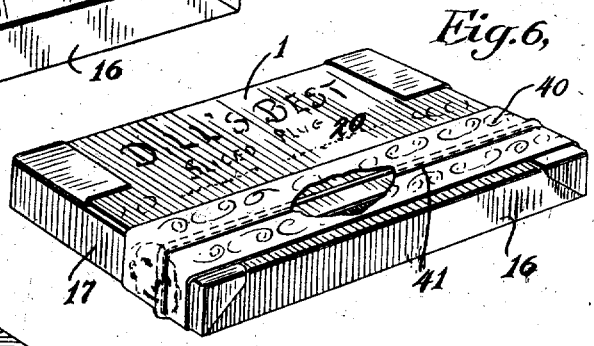
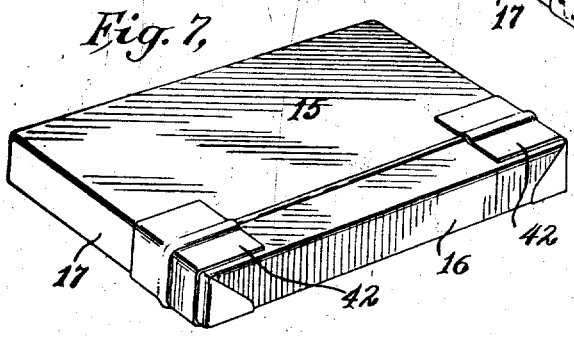
INVENTOR
JONATHAN PETERSON
BY
J. Granville Meyer
ATTORNEY Reissued May 26, 1925.

Re. 16,084

UNITED STATES PATENT OFFICE.

JONATHAN PETERSON, OF BROOKLYN, NEW YORK, ASSIGNOR TO COMBINATION MACHINE COMPANY, OF NEW YORK, N. Y., A CORPORATION OF DELAWARE.

TOBACCO PACKAGE OR CONTAINER.

Original No. 1,512,000, dated October 14, 1924, Serial No. 652,064, filed July 17, 1923. Application for reissue filed December 10, 1924. Serial No. 755,116.

*To all whom it may concern:*

Be it known that I, JONATHAN PETERSON, a citizen of the United States, and resident of Brooklyn, in the county of Kings and State of New York, have invented certain new and useful Improvements in Tobacco Packages or Containers, of which the following is a specification.

My invention relates to packages or containers especially well adapted for packing various commodities, including tobacco in various forms, and particularly sliced plug tobacco in small quantities for pocket use of individual consumers.

Sliced plug smoking tobacco has heretofore been packed in hinged covered sheet metal boxes in order to keep the tobacco fresh and moist and particularly to keep the thin slices from being broken while in the package. Such metal containers are expensive, and add very materially to the cost of the package.

An important object of the present invention is to dispense with such metal containers and to provide a package or container for moderate quantities of sliced plug tobacco suitable for pocket use of individual consumers, consisting largely of paper, and in a particular embodiment, as herein disclosed, consisting entirely of metalfoil and paper, which while not absolutely rigid has sufficient strength and stiffness to preserve its form and effectively protect the slices of tobacco from breaking or crumbling, is very much cheaper than the metal container, is thin, compact and of convenient shape for pocket carrying, preserves the tobacco in fresh condition until the package is opened, and is easily opened and closed after the original opening to permit one slice of tobacco to be withdrawn at a time.

The characteristics and advantages of the invention are further sufficiently explained in connection with the following detail description of the accompanying drawings, which show one representative embodiment of the invention. After considering this embodiment, persons skilled in the art will understand that many variations may be made within the principles of the invention, and I contemplate the employment of any structures which are properly within the scope of the appended claims.

Fig. 1 is a perspective view showing the different container materials or "blanks" in spaced, superposed relation.

Fig. 2 shows the inner container or "tray" filled with tobacco, and the inner and outer wrappers associated with the box and partly folded.

Fig. 3 shows the wrapper formation completed but not closed.

Fig. 4 is a detail showing one of the outer wrapper flap connections.

Fig. 5 shows the closure end fold formation of the outer wrapper, the closure member in an intermediate, or partly open position.

Fig. 6 shows the top or upper face of the completed package.

Fig. 7 shows the bottom thereof.

The container as here shown and described, consists, in a preferred form of the invention, of an inner container A which may otherwise be identified as a tray or box, an inner wrapper B, which might in some cases be a single sheet of material, but preferably is a composite wrapper consisting of a sheet of rather thin paper *p* and a sheet of metalfoil *t*, which is usually of quite substantial thickness, the paper and foil being usually secured together by spaced strips of adhesive *a*, and an outer wrapper or cover C, which is usually paper of substantial thickness and of suitable quality to provide the desired "finish" or decorative appearance of the completed package. The outer face of the cover sheet is usually imprinted with any suitable indicia 1, Figure 6.

The tray A, which may be included or omitted, depending on the nature of the package-contents, is usually of cardboard of moderate thickness, to provide a certain interior stiffening or reenforcement of the package. It consists of a central or body section 2, side wings 3 and end wings 4, and the blank is suitably creased or scored and the wings are folded up as shown in Figure 2. The tobacco contents, consisting in the present example of a plurality of slices of sliced plug tobacco, usually arranged in two rows, is placed in the tray, the tobacco contents coming flush with the edges of the upturned wings 3 and 4.

The filled tray is placed upon a central body portion 5 of the composite inner wrapper B as shown in Fig. 2. This composite wrapper is cut to provide side wall portions 6 and end wall portions 7 corresponding substantially to the side and end walls of the tray. Triangular wings 8 are provided extending from the end wall members 7, these wings being designed to lie upon the tobacco contents of the package near the ends thereof. A front cover or closure flap 9 extends from one of the side wall portions 6 and a rear cover flap 10, usually wider than flap 9, extends from the other side wall portion.

At the intersections of the triangular flaps 8 and the closure flaps 9 and 10, the right-angled fold or corner flaps 11 are provided. Before the inner wrapper and the tray are associated with the outer wrapper, or at least before the fold formation of the outer wrapper is produced, the wall and wing portions 7 and 8, and the wall and closure flap portions 6 and 9 and 6 and 10 are folded up at right angles to the bottom section 5 in substantially the position shown in Fig. 3, and the corner flaps 11 are then folded as indicated in Fig. 3, the folded flaps usually being turned down flat against end wall of the package, as there shown.

The embryo package consisting of the tray and inner wrapper is now, or it may have been previously, placed upon the outer wrapper C, occupying the central or body portion 15 thereof. The wrapper also has wall portions 16 corresponding to the side walls of the tray and inner wrapper, end wall portions 17, end flaps 18 extending from the end wall portions, and front and rear closure flaps 19 and 20 extending from the side wall portions 16. The wrapper is preferably formed so that when its parts are completely folded and secured it provides a neck or open mouth of substantial depth, as shown in Fig. 3. To secure this mouth or neck formation the blank is provided with sealing flaps 21 which are folded along the dotted lines 22, 23 and 24 in completing the neck or closure formations. The outer wrapper wall portions 17 and end flaps 18, front wall portions 16 and rear closure flaps 19 and 20, are now turned up at right-angles to the body section 15, (Fig. 1) and the parts are secured by folding the sealing flaps 21 along the dotted lines above mentioned, corner folds being produced along the lines 24, Fig. 3 and the main portions of the flaps being turned over and secured adhesively to faces of the front and rear flaps 19 and 20 respectively, as also clearly shown in Fig. 3. The package is now completed except for closing the mouth or neck, which consists of members 18, 19 and 20 of the outer wrapper, with the cover or closure flaps 9 and 10 of the inner composite wrapper standing up against the inner faces of the outer wrapper flaps 19 and 20 respectively, as clearly shown in Fig. 3.

To properly close the package, the end flaps 18 are now folded along the diagonal lines 25, and these lines may be produced in the folding of the closure parts, or they may be provided in the form of creased or scored lines on the blank, as shown in dotted lines, Fig. 1. The folding of the end flaps 18 along the dotted lines, as shown in Fig. 5, produces substantially triangular end closure flaps or tongues 30 adapted to overlie flaps 8 of the inner wrapper, and bellows fold portions 31 which lie between the tongues 30 and front and rear cover flaps 9 and 10 of the inner wrapper, and sufficiently retain those flaps against the wrapper flaps 19 and 20; or in other words, the inner wrapper flaps are located between the bellows fold members 31 and the wrapper flaps 19 and 20, so that when the package is opened the inner wrapper flaps will be raised along with the outer wrapper neck, giving easy and quick access to the package contents.

The neck or closure parts are now folded completely down producing the complete tightly closed, flat and rectangular package, as shown in Fig. 6. Closure flap 20 need not be sealed adhesively, and when adhesive sealing is dispensed with the package may be sealed only by a revenue stamp 40 applied over the flap 20 and with its ends overlying the ends of, and adhesively secured on the bottom of the package, as sufficiently shown in Fig. 7.

It is desirable in some cases to provide a conveniently operated device for securing flap 20 temporarily after the package has been first opened, so that it can be easily resecured after each slice of tobacco is removed. For this purpose a rubber band 41 is placed about the package over flap 20 near the free end thereof, in the position shown in Fig. 6, and the rubber band may desirably be secured in position by the revenue stamp, as also shown in Figs. 6 and 7.

To initially open the package with the rubber band and revenue stamp arranged as described, it is only necessary to tear away the portion of the stamp overlying flap 20, and then the rubber band may be pulled away from the top of the package and will remain attached to the bottom of the package by end portions 40 of the stamp. Cover flap 20 is then raised, whereupon the entire neck structure is lifted to approximately the position shown in Fig. 3, to permit the easy withdrawal of a slice of tobacco, and then may be easily reclosed, and in fact the closure members return to closed position automatically when closure flap 20 is depressed. The rubber band is then snapped around in normal position, as shown in Fig. 6, and the package is ready to be slipped back into the pocket.

The inner cardboard container or tray, reenforced by the inner wrapper and outer wrapper, provides ample stiffness to prevent crumbling or breaking of the tobacco contents, although the package is not absolutely rigid. The inner wrapper of composite paper and foil, preserves the moisture and freshness of the tobacco. The described construction obviates the necessity for using sheet metal boxes for small quantities of tobacco of this character, and an immense saving is therefore effected in the cost of such metal containers, and a given quantity of tobacco can be sold at a lower price, or greater quantity can be sold at the usual price, than has heretofore been possible.

The described arrangement or formation of inner and outer wrappers, with their flaps formed and secured in the manner indicated, provides a secure package closure which at the same time affords an easily manipulated mouth or opening at one broad or major side of the package, giving immediate access, when the flaps are opened, to the entire broad surface of the commodity, to facilitate removal of a part of it without disturbing other parts, as in the case of sliced plug tobacco or other commodities of which it is desired to remove small parts or quantities at a time, with the outer flap formations constituting a neck which prevents accidental displacement of the contents. When the desired quantity of the commodity is removed the flap formations are easily and practically automatically folded down to form a smooth, flat closure, the inner wrapper flaps being especially flat and compact upon the commodity surface since no tuck or bellows fold formations are necessary in the inner wrapper closure members, and the outer wrapper flap or neck formation then folds down very flat and smoothly upon the inner wrapper flaps.

I claim:

1. As a new article of manufacture, a thin and approximately flat tobacco package for convenient pocket use, which dispenses with a metal container and has sufficient strength and stiffness to protect the tobacco contents, comprising an inner tray of sheet material of substantial stiffness, a quantity of tobacco substantially filling the tray, an inner wrapper including metalfoil substantially enclosing the tray and tobacco and having top flaps movably overlying the tobacco contents, and an outer paper wrapper of substantial thickness formed and secured about the tray and inner wrapper and having closure means arranged for repeated opening and closing and including an outer flap, said closure means being constructed and arranged to be folded down flat upon the package top with said outer flap uppermost, to completely cover and close the package.

2. A tobacco package comprising an inner tray of cardboard of substantial thickness, having a bottom portion and upturned side and end walls, a plurality of slices of sliced plug tobacco substantially filling the tray, an inner wrapper of composite foil and paper folded about the tray and having triangular flaps adapted to lie on the tobacco contents of the tray, and also having front and rear closure flaps, and an outer paper wrapper having a body section underlying the tray and inner wrapper, side and end wall portions surrounding side and end walls of the inner wrapper and tray, and a neck of substantial depth, consisting of a front flap, a rear flap having a portion extending considerably above the normal contour of the neck, and end portions having connecting flaps adhesively secured to the front and rear portions, said end portions of the neck being adapted to be folded on diagonal lines to produce tuck-folds which retain the inner wrapper closure flaps in position against the front and rear wall portions of said neck.

3. A commodity package for convenient pocket use, which is relatively thin and approximately flat, dispenses with a metal container and has sufficient strength and stiffness to protect the contents, comprising a commodity, an inner wrapper of flexible sheet material folded to substantially enclose the commodity and having top flaps movably overlying the same, and an outer wrapper of sheet material of substantial thickness and strength formed and secured about the inner wrapper and having closure means including an outer flap, said closure means being constructed and arranged to be folded down flat upon the package top with said outer flap uppermost to completely cover and close the package, and also capable of being repeatedly opened without impairment of the closure structure, to give access to the inner wrapper flaps and the commodity.

4. A tobacco package for convenient pocket use, which is relatively thin and approximately flat, dispenses with a metal container and has sufficient strength and stiffness to protect the tobacco contents, comprising a quantity of tobacco, an inner wrapper of flexible sheet material folded to substantially enclose the tobacco and having top flaps movably overlying the contents, and an outer wrapper of sheet material of substantial thickness, formed and secured about the inner wrapper and having closure means including an outer flap, said closure means being constructed and arranged to be folded down flat upon the package top with said outer flap uppermost and without necessity for adhesive sealing, to completely cover and close the package, and also capable of being repeatedly opened to give access to the inner wrapper flaps and contents.

5. A tobacco package for convenient pocket use, which is relatively thin and approximately flat, dispenses with a metal container and has sufficient strength and stiffness to protect the tobacco contents, comprising a quantity of tobacco, an inner wrapper of flexible sheet material including metal foil, substantially enclosing the tobacco and having top flaps movably overlying the contents, and an outer paper wrapper of substantial thickness, formed and secured about the inner wrapper and having closure means including an outer flap, said closure means being constructed and arranged to be folded down flat upon the package top with said outer flap uppermost and without necessity for adhesive sealing, to completely cover and close the package and also capable of being repeatedly opened to give access to the inner wrapper flaps and contents.

6. A commodity package for convenient pocket use, comprising a commodity in substantially rectangular, relatively flat arrangement, and inner and outer wrappers closely enclosing the commodity, the inner wrapper including a bottom portion underlying the commodity, relatively narrow portions arranged to overlie vertical faces of the commodity, front and rear flaps arranged to overlie the top of the commodity and one to overlap the other, and small end flaps arranged to overlie end portions of the top of the commodity beneath the front and rear flaps, and the outer wrapper including a bottom section and flaps at four sides thereof, folded and secured to enclose the bottom and vertical walls of the inner wrapper and to form a neck at the top of the commodity, the end and front outer wrapper flaps being relatively short, the rear flap being relatively wide, and the end flaps being formed with bellows folds, whereby the inner and outer wrapper flaps may be folded down to enclose and protect the commodity with the rear outer wrapper flap substantially covering the other flaps and forming a complete closure, and the outer and inner wrapper flaps may be raised to expose the broad top face of the commodity with the outer wrapper neck protecting the commodity from accidental displacement.

7. A box-like container formed from a substantially cruciform paper blank of substantial thickness and strength including a central portion, a front wing, an opposite rear wing longer than the front wing, and opposite end wings, certain wings having narrow marginal portions, the blank being folded in box form with the wings in perpendicular relation to the central portion and with said margins folded upon and adhesively secured to marginal portions of adjacent wings to form a closure neck with a portion of the rear wing extending above the upper edges of the other wings, the end wings being creased for ready folding in flat bellows formation to enclose a commodity, with the front wing lying upon the folded end wings and a rear wing overlying the front end wings to form an overall outer cover for the folded neck.

Signed at New York city, this 16th day of March, 1925.

JONATHAN PETERSON.